3,118,906
3-SUBSTITUTED-3-PYRROLIDINOLS
Yao Hua Wu, Rolland Frederick Feldkamp, and William
 Andrew Gould, Evansville, Ind., assignors to Mead
 Johnson & Company, Evansville, Ind., a corporation of
 Indiana
No Drawing. Filed Aug. 14, 1961, Ser. No. 131,067
4 Claims. (Cl. 260—326.5)

This patent application is concerned with the substances 3-(4-chlorophenyl)-5-methyl-3-pyrrolidinol, 3-(4-bromophenyl)-5-methyl-3-pyrrolidinol, and the pharmaceutically acceptable acid addition salts of these compounds. This invention is also concerned with processes for the production of these substances, and with their use in the treatment of certain disease conditions.

The compounds of the present invention have utility as therapeutic agents. They possess various pharmacological properties, including vasopressor-depressor effects and papaverine-like smooth muscle depressant effects. The present substances do not appear to function by any particular hormonal blocking action, such as cholinergic or adrenergic blocking actions, and have the property of relaxing smooth muscle in the spastic state, regardless of the agent or hormone responsible for the condition. Doses necessary to obtain a depressant effect on intestinal, uterine, or biliary smooth muscle are substantially higher than those required for bronchodilator action.

Specifically, these substances possess a rather selective action on the smooth muscle of the bronchials. They are characterized by low toxicities and are approximately as potent as bronchodilators as aminophylline or ephedrine in the guinea pig, cat, and dog. They have the advantage, however, over aminophylline and the sympathomimetic amines such as ephedrine of having much less effect on the central nervous system and the cardiovascular system. Side effects frequently associated with aminophylline and agents of the ephedrine class include excitement, palpitation, dizziness, sweating, tachycardia, syncope, etc. Thus, they have the potency of aminophylline or ephedrine but are relatively free of the undesirable side effect of those drugs.

3-(4-chlorophenyl)-5-methyl-3-pyrrolidinol when administered intravenously to rats has the property of localizing or concentrating in lung tissue. Furthermore, the relatively high concentrations observed in the lung remain for a relatively prolonged period, resulting in an enhancement in the efficiency of the substance. It also has substantial anti-inflammatory action conferring a further advantage upon it for use in certain types of respiratory difficulties. The substance does not remain in the bloodstream for appreciable periods, but is rapidly distributed to extravascular cites, particularly the lungs, where it exerts a prolonged effect. Its duration of effect is longer than that of aminophylline or of ephedrine. It also possesses a significant antihistaminic action. The anti-inflammatory properties of the drug are characterized by its ability to reduce the increased capillary permeability frequently associated with inflammatory conditions.

The compounds of the present invention are prepared from the corresponding 1-lower acyl or 1-lower carbalkoxy-3-pyrrolidinols, for instance, from 1-carbethoxy-3-(4-chlorophenyl)-5-methyl-3-pyrrolidinol, 1-carbethoxy-3-(4-bromophenyl-5-methyl-3-pyrrolidinol, or the corresponding 1-acetyl compounds. The 1-acyl and 1-carbalkoxy compounds required as starting materials for the present invention are prepared as described in copending application Serial No. 109,269, now Patent 3,038,208, filed May 11, 1961, by Wu, Feldkamp, and Lobeck, which in turn is a continuation-in-part of application Serial No. 792,711, now abandoned, filed February 12, 1959. The 1-acyl or 1-carbalkoxy groups thereof preferably contain up to about four carbon atoms. The preparation is carried out by hydrolysis or alcoholysis of these intermediates in the presence of strong alkaline materials, such as sodium methoxide, potassium t-butoxide, sodium hydroxide, potassium hydroxide, calcium oxide, calcium ethoxide, or calcium hydroxide. Strong acid conditions for hydrolysis or alcoholysis are usually to be avoided, since dehydration with loss of the 3-hydroxyl group sometimes occurs. Convenient conditions for carrying out the reaction involve treatment of the 1-carbalkoxy or 1-acyl-3-aryl-3-pyrrolidinol with potassium hydroxide in refluxing aqueous n-propanol.

The pharmaceutically acceptable acid addition salts are prepared by reaction of the present pyrrolidinols with a molar equivalent of the appropriate acid. Again, treatment with a large excess of a strong acid is to be avoided as are high temperatures. For example, the pyrrolidinols may be dissolved in ether or other suitable solvents and treated with a calculated amount of the desired acid. Pharmaceutically acceptable salts include the hydrobromides, hydrochlorides, hydroiodides, sulfates, phosphates, acetates, citrates, gluconates, succinates, tartrates, mucates, and benzoates, etc.

The compounds of the present invention each contain two asymmetric carbon atoms and, therefore, are capable of existing in four isomeric forms. These occur as two racemates which can be separated into the pure optical isomers, the d- and the l-forms. The present invention is intended to include each of these forms and mixtures thereof.

The compounds of the present invention may be administered for pharmaceutical purposes by either the oral or the parenteral routes, in doses ranging from 3 to 120 mg./kg. of body weight. Various types of pharmaceutical dosage formulations may be employed, including tablets, capsules, elixirs, solutions, suspensions, etc. Such compositions may contain one of the present compounds as the sole active ingredient, or they may be combined with other active ingredients to provide complementary pharmacological effects. For instance, they may be combined with tranquilizers, sedatives, antibiotics, analgesics, antipyretics, hypnotics, or other agents useful in the treatment of respiratory conditions where the use of a bronchodilator may also be indicated.

The present application is a continuation-in-part of our co-pending application Serial No. 2571, filed January 15, 1960, which in turn is a continuation-in-part of our previously filed application, Serial No. 792,712, filed February 12, 1959, and now abandoned.

The following examples are provided to illustrate the preparation of specific compounds of the present invention. The scope of the invention is not to be considered as limited to these specific embodiments, however.

Examples 1 and 2

1-carbethoxy - 3 - (4-chlorophenyl)-5-methyl-3-pyrrolidinol or 1-carbethoxy - 3 - (4-bromophenyl)-5-methyl-3-pyrrolidinol, 0.1 mole, is refluxed for 20 hours with a solution of 25 g. of potassium hydroxide, in a mixture of 50 ml. each of n-propyl alcohol in 50 ml. of 10 N aqueous potassium hydroxide. The mixture is stirred during the course of the reflux period and the alcoholic layer then separated and diluted with 400 ml. of isopropyl ether. The ether layer is separated and dried over anhydrous magnesium sulfate. The drying agent is then removed and the clear filtrate treated with ethanolic hydrogen chloride, resulting in precipitation of the hydrochloride salt of the desired product.

3-(4-chlorophenyl) - 5 - methyl - 3 - pyrrolidinol hydrochloride is recrystallized from a mixture of ethanol and diethyl ether. The pure crystalline material melts at 180–181° C. and is shown by microanalysis to be comprised of 53.17% carbon, 6.12% hydrogen, and 14.31% chlorine. All percentages are by weight. This substance is thought to be a pure racemate and is optically inactive.

3-(4-bromophenyl) - 5 - methyl - 3 - pyrrolidinol hydrochloride is recrystallized from a mixture of isopropanol and isopropyl ether. It exhibits a melting point of 204–205° C. with decomposition. It is shown by microanalysis to be comprised of 45.20% carbon, 5.29% hydrogen, and 4.90% nitrogen by weight. It, too, is optically inactive.

Both substances exhibit infrared absorption maxima at the following wave lengths: 1025, 1100, 1490, 1600, 2780, 2880, 2920, 3050, and 3300 cm.$^{-1}$.

Example 3

A 25 g. sample (0.1 mole) of 3-(4-chlorophenyl)-5-methyl-3-pyrrolidinol hydrochloride is dissolved in 100 ml. of water and a solution of 17 g. (0.05 mole) of ammonium bromocamphorsulfonate in 150 ml. of water is added thereto. Upon standing at room temperature, crystallization occurs. The crystalline material is collected and labelled A. The filtrate is labelled B.

Material A is dried, yield 25.1 g., M.P. 223–225° C. $[\alpha]_D^{25}=60.19°$ (c.=1 in 95% alcohol). This material, the bromocamphorsulfonate salt of the levorotatory form of 3-(4-chlorophenyl) - 5 - methyl - 3 - pyrrolidinol, is then recrystallized from ethanol-water, yielding the pure bromocamphorsulfonate salt of l-3-(4-chlorophenyl)-5-methyl-3-pyrrolidinol, $[\alpha]_D^{25}=+59.99°$ (c.=1, 95% alcohol). The free base form thereof is then regenerated by dissolving the purified bromocamphorsulfonate salt in 200 ml. of ethanol and adding 25 ml. of dilute sodium hydroxide solution thereto. The bulk of the solvent is then removed by distillation and replaced with 400 ml. of water. The free base prepared in this fashion is insoluble in water and is collected on a filter, M.P. 146–150° C., $[\alpha]_D^{25}=-2.27°$. This material is then repeatedly recrystallized from ethanol-water or benzene-hexane until samples from successive recrystallizations exhibit the same melting points and rotations. The pure free base form of l-3-(4-chlorophenyl)-5-methyl - 3 - pyrrolidinol exhibits M.P. 148–149° C. and $[\alpha]_D^{25}=-3.42°$ (c.=1, 95% alcohol).

The filtrate, material B above, obtained after collecting the crude bromocamphorsulfonate salt of the l-form of 3-(4-chlorophenyl) - 5 - methyl - 3 - pyrrolidinol above contains the hydrochloride salt of the d-form of that compound. The free base thereof is separated by treating this filtrate with sodium hydroxide and collecting the precipitated solid, yield 10.13 g., M.P. 134–143° C., $[\alpha]_D^{25}=+3.29°$ (c.=1, 95% alcohol). This material is then further purified by repeatedly recrystallizing it either from ethanol-water or benzene hexane until samples from successive crystallizations exhibit the same melting point and rotation. Pure crystalline d-3-(4-chlorophenyl) - 5 - methyl - 3 - pyrrolidinol exhibits M.P. 148–149.5° C., $[\alpha]_D^{25}=+3.60$ (c.=1, 95% alcohol). The pure d- and l-forms individually where found to have the same bronchodilator activity in the isolated trachial spiral of the guinea pig as the racemate described above from which they were obtained. Their toxicities in mice are identical with that of the racemate.

Example 4

Tablets containing 3-(4-chlorophenyl)-5-methyl - 3-pyrrolidinol hydrochloride are prepared as follows:

| Ingredients | Weight Per Tablet, mg. | Weight Per 100,000 Tablets, kg. |
| --- | --- | --- |
| 3-(4-chlorophenyl)-5-methyl-3-pyrrolidinol hydrochloride | 200 | 20.0 |
| Calcium Phosphate, Dibasic | 100 | 10.0 |
| Lactose | 70 | 7.0 |
| Starch, Corn | 28 | 2.8 |
| Magnesium Stearate | 2 | 0.2 |
| Total Weight | 400 | 40.0 |

For a 100,000 tablet batch the above amounts of 3-(4-chlorophenyl) - 5 - methyl-3-pyrrolidinol hydrochloride, calcium phosphate, lactose and 2.2 kg. of the corn starch are dry blended and then wet granulated with 6 kg. of 10% aqueous corn starch paste. The resulting granulation is screened, dried, and rescreened. The granules are then coated with the magnesium stearate, which serves as a tableting lubricant, and the finished granules are compressed into tablets weighing 400 mg. each, using ordinary tableting equipment and methods.

Example 5

A dry blend of the following ingredients is prepared:

|  | Kg. |
| --- | --- |
| 3-(4-chlorophenyl)-5-methyl - 3 - pyrrolidinol hydrochloride | 20.0 |
| Lactose | 4.8 |
| Magnesium stearate | 0.2 |
| Total | 25.0 |

This mixture is then employed to fill No. 2 hard gelatin capsules, each with 250 mg. of the blend.

Example 6

A solution for injection is prepared as follows: 3-(4-chlorophenyl)-5-methyl-3-pyrrolidinol hydrochloride, 500 g., is dissolved in 9 l. of water for injection, U.S.P. The pH of the solution is adjusted to 5.7±0.1 using dilute aqueous sodium hydroxide or hydrochloric acid as required. The solution is filtered sparkling clear, and 2 ml. thereof is filled into each of a group of ampoules made of Type I glass, and sealed. The sealed ampoules are sterilized by heating in an autoclave at 121° C. for 15 minutes.

Doses of from 200–400 mg. orally at intervals of from about 8 to 12 hrs. are recommended for human use. Higher or lower doses at greater or shorter intervals depending upon the patient's needs may be employed. Lower doses by parenteral administration may be employed. Liquid and solid dosage units, then, containing from 100 to 400 mg. of one of the present products are preferred. Both liquid and solid carriers of the usual types may be employed including corn starch, lactose, calcium phosphate, polyethylene glycol, water, sesame oil, peanut oil, propylene glycol, etc. In any event the specific dosage and dosage form to be employed is to be determined by the physician, which in his judgment is best suited for the patient concerned.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:
1. A compound selected from the group consisting of 3-(4-chlorophenyl)-5-methyl-3-pyrrolidinol, 3-(4-bromophenyl)-5-methyl-3-pyrrolidinol, and the pharmaceutically acceptable acid addition salts thereof.
2. 3-(4-bromophenyl)-5-methyl-3-pyrrolidinol.
3. 3-(4-chlorophenyl)-5-methyl-3-pyrrolidinol.
4. 3-(4-chlorophenyl)-5-methyl-3-pyrrolidinol hydrochloride.

References Cited in the file of this patent
UNITED STATES PATENTS

| | | |
|---|---|---|
| 2,852,526 | Villani et al. | Sept. 16, 1958 |
| 2,878,264 | Lunsford | Mar. 17, 1959 |
| 2,902,404 | Spencer | Sept. 1, 1959 |
| 2,976,213 | Murphey | Mar. 21, 1961 |

OTHER REFERENCES

Wagner Zook: "Synthetic Organic Chemistry," page 415 (1953), John Wiley and Sons, Inc.

UNITED STATES PATENT OFFICE
CERTIFICATE OF CORRECTION

Patent No. 3,118,906　　　　　　　　　　　　　　January 21, 1964

Yao Hua Wu et al.

It is hereby certified that error appears in the above numbered patent requiring correction and that the said Letters Patent should read as corrected below.

Column 2, line 6, for "3,038,208" read -- 3,083,208 --; column 4, in the table of Example 4, third column, in the heading thereof, for "100,000" read -- 100,000 --.

Signed and sealed this 30th day of June 1964.

(SEAL)
Attest:

ERNEST W. SWIDER　　　　　　　　　　　　　　EDWARD J. BRENNER
Attesting Officer　　　　　　　　　　　　　　　Commissioner of Patents